July 18, 1933.  R. R. SEARLES ET AL  1,918,988
DUST SEAL
Filed May 20, 1927
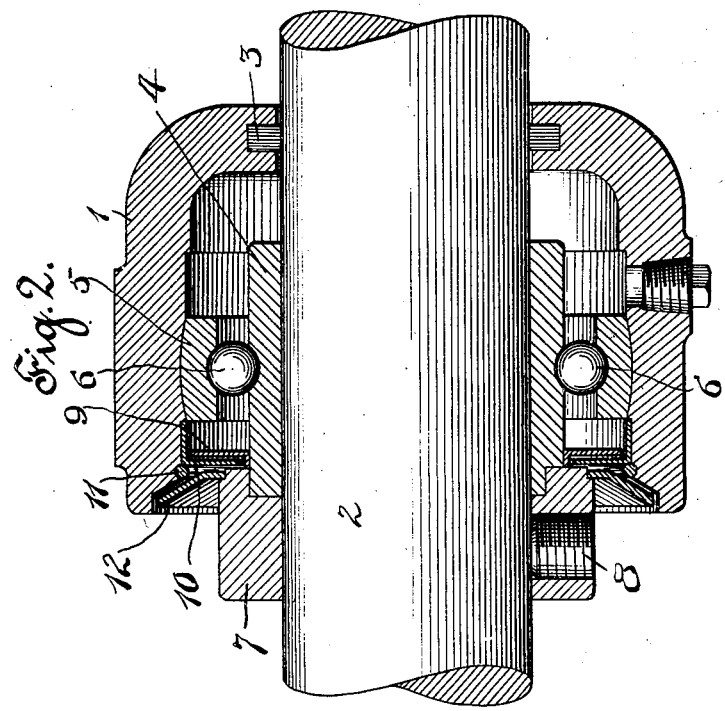
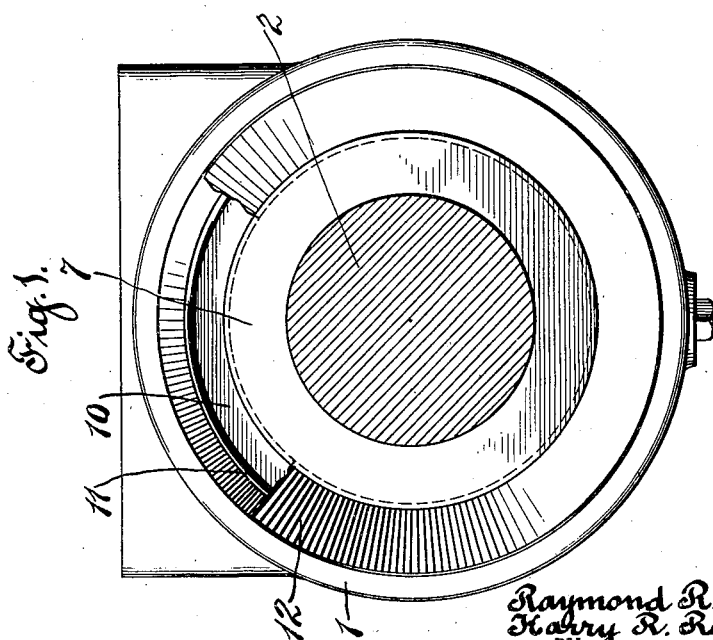
INVENTORS.
Raymond R. Searles
Harry R. Reynolds
BY
ATTORNEYS.

Patented July 18, 1933

1,918,988

UNITED STATES PATENT OFFICE

RAYMOND R. SEARLES AND HARRY R. REYNOLDS, OF NEW BRITAIN, CONNECTICUT, ASSIGNORS TO THE FAFNIR BEARING COMPANY, OF NEW BRITAIN, CONNECTICUT, A CORPORATION OF CONNECTICUT

DUST SEAL

Application filed May 20, 1927. Serial No. 192,835.

Our invention relates to certain new and useful improvements in bearings.

It is the principal object of the invention to provide simple efficient means for excluding dust from an anti-friction bearing.

In the accompanying drawing, which shows for illustrative purposes only, a preferred form of the invention:

Fig. 1 is an end view of a bearing housing and sealing ring partly broken away;

Fig. 2 is a longitudinal central section through the housing and bearing shown in Fig. 1.

In said drawing, 1, represents a housing of a pillow block, illustrated merely as an example of a bearing housing, properly chambered to receive an anti-friction bearing. 2 is a shaft which passes through the housing, one end of the latter being contracted and usually provided with a felt or similar dust-proof bushing or washer 3. The bearing proper comprises an inner bearing ring 4, which is mounted on the shaft 2, and a narrower, outer bearing ring 5, which is mounted to oscillate in the housing 1. 6—6 are bearing balls between the rings 4 and 5 to reduce friction. 7 is a locking ring for the inner bearing ring 4, this locking ring being usually provided with a set screw 8 and is properly connected with the ring 4, so that when the ring 7 is locked on the shaft 2 the ring 4 is similarly locked.

Mounted on the inner bearing ring 4 is a ring 9, which is preferably arranged at right angles and formed of comparatively thin sheet metal. This may be flanged at its inner edge to properly fit, friction tight, on the ring 4. Just outside of this ring 9 is another ring 10, which functions as a relatively non-rotatable partition between the rings 9 and 12. This ring 10 is seated in the open end of the body 1, as by means of a flange. 11 is a split ring which may serve to keep the ring 10 in place.

The outer end of the housing 1 is recessed to receive an outwardly flared seal ring 12, which is preferably mounted on the locking ring 7 and independently of the mounting for the ring 9, so that it may turn with the shaft and be readily removed with said ring 7 without disturbing the ring 9. It will be observed that a slight clearance is provided between the ring 12 and the adjacent wall of the housing 1. By providing this clearance the shaft may be oscillated to a limited extent within the pillow block 1, for self-aligning purposes, without bringing this ring into frictional contact with the housing 1. When the invention is embodied in a construction in which the shaft does not oscillate the clearance may be very slight.

During the rotation of the shaft 2 the flared plate 12 tends when rotating to throw off dust particles and prevent their entry into the bearing. The clearance between the plate 12 and the correspondingly shaped recess in the housing is preferably very small, and any dust which might otherwise tend to enter this small clearance space will be carried away by the draft created by the rotating plate 12. When the rings 9—12 are employed they function respectively to hold grease within the bearing and to exclude dust therefrom. We wish it understood, however, that the flared plate 12 is not confined to use with the rings 9—10, for said flared plate 12 may be used alone and independently of any other seal employed.

We claim:

1. In a device of the character described, a bearing housing, having an outwardly flared open recess at one end, a shaft passing through said housing, a bearing in said housing for supporting said shaft, a locking ring for holding part of said bearing to said shaft, and a flared seal ring carried by and rotatable with said locking ring, said sealing ring substantially fitting said flared recess in said housing, said locking ring and flared sealing ring being removable as a unit to unlock said bearing and shaft and open the end of said housing.

2. In a device of the character indicated, a rotatable shaft, a housing surrounding said shaft and having an enlarged passage at one end, an outer bearing ring in said housing, an inner bearing ring, anti-friction bearing elements interposed between said rings, and means for sealing the enlarged passage into said housing comprising an outwardly flared ring rotatable with said inner bearing ring and lying closely adjacent the wall of the enlarged passage in said housing whereby dust will be centrifugally thrown away from said opening upon rotation of said inner bearing ring.

3. In a self aligning bearing, a non-rotatable housing having a passage for a shaft, the passage at one end being enlarged, a unit handling ball bearing insertable into the housing through the enlarged passage, said bearing including an outer bearing ring with means for mounting said bearing ring in the housing to oscillate, the inner bearing ring being longer than the outer bearing ring and projecting toward that end of the housing having the enlarged passage, a relatively stationary partition ring carried by the housing and overstanding but free from the inner bearing ring, a grease seal ring mounted to rotate on the inner ring in the bearing inside of the partition ring, a locking ring mounted on the shaft for locking the inner bearing ring on the shaft against rotation relatively thereto, an outwardly extending dust slinging ring mounted on said locking ring and outside of said partition, with clearance between said dust ring, said partition, and said oil grease seal ring to permit without interference limited oscillation of said shaft and unitary ball bearing within said housing.

4. In a device of the character described, a rotatable shaft, a support therefor comprising a non-rotatable housing surrounding the shaft and having an enlarged entrance at one end to admit an anti-friction bearing, an anti-friction bearing comprising an outer bearing ring held within the housing and an inner bearing ring longer than the outer ring and mounted on said shaft and within the housing, anti-friction bearing devices interposed between said rings, means for holding the inner ring against rotation of said shaft by engaging the end thereof, said means being rotatable with said shaft, and an outwardly extending flange carried thereby and substantially covering the enlarged entrance to said housing whereby dust will be centrifugally flung outwardly and away from said opening upon rotation of said flange by said shaft.

5. In a device of the character described, a rotatable shaft, a support therefor comprising a non-rotatable housing surrounding the shaft and having an enlarged entrance at one end to admit an anti-friction bearing, an anti-friction bearing comprising an outer bearing ring held within the housing and an inner bearing ring longer than the outer ring and mounted on said shaft and within the housing, anti-friction bearing devices interposed between said rings, means for holding the inner ring against rotation of said shaft by engaging the end thereof, said means being rotatable with said shaft, and an outwardly extending flange carried thereby and substantially covering the enlarged entrance to said housing whereby dust will be centrifugally flung outwardly and away from said opening upon rotation of said flange by said shaft, said housing having a protecting flange to overstand and protect the edge of said rotatable flange.

RAYMOND R. SEARLES.
HARRY R. REYNOLDS.